UNITED STATES PATENT OFFICE.

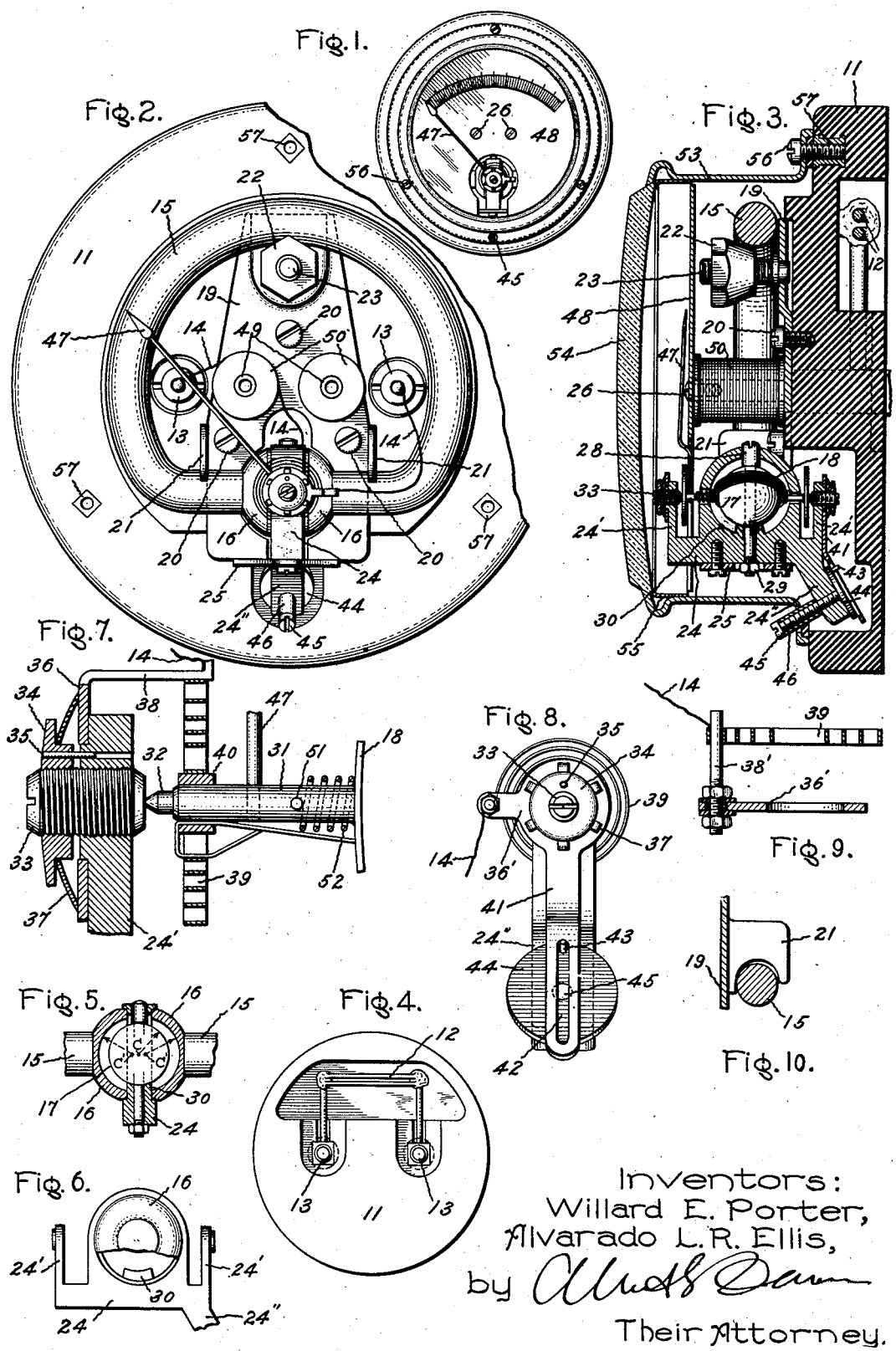

WILLARD E. PORTER AND ALVARADO L. R. ELLIS, OF LYNN, MASSACHUSETTS, ASSIGNORS TO GENERAL ELECTRIC COMPANY, A CORPORATION OF NEW YORK.

ELECTRICAL MEASURING INSTRUMENT.

1,306,624.   Specification of Letters Patent.   Patented June 10, 1919.

Application filed November 12, 1917. Serial No. 201,618.

*To all whom it may concern:*

Be it known that we, WILLARD E. PORTER and ALVARADO L. R. ELLIS, citizens of the United States, residing at Lynn, in the county of Essex, State of Massachusetts, have invented certain new and useful Improvements in Electrical Measuring Instruments, of which the following is a specification.

This invention relates to electrical measuring instruments, and particularly to electrical measuring instruments of the D'Arsonval type.

The general object of the invention is to provide an improved electrical measuring instrument. More specifically the invention aims to provide an improved electrical measuring instrument of the D'Arsonval type, and in this connection the principal object of the invention is to provide an improved construction of D'Arsonval instrument in which the moving element is positioned in a substantially spherical air gap. The invention further aims to provide certain improvements in the mechanical construction of electrical measuring instruments, and in particular instruments of the D'Arsonval type.

The novel features of the invention as well as the construction and mode of operation of an electrical measuring instrument embodying the same will be best understood by reference to the accompanying drawings and the following description of such an instrument. In the accompanying drawings,—

Figure 1 is a top plan view of an electrical measuring instrument embodying the invention; Fig. 2 is an enlarged plan view of the instrument with the cover removed; Fig. 3 is a sectional view through the center of the instrument; Fig. 4 is a plan view of the bottom of the instrument; and Figs. 5, 6, 7, 8, 9 and 10 are views illustrating certain details of the instrument's construction.

The operative elements of the instrument illustrated in the accompanying drawings are mounted on a supporting back or base 11 of molded insulating material. The base 11 has a rear recess designed to accommodate an electric current shunt 12. This shunt is connected across the terminals 13 of the instrument. The terminals 13 extend through the base 11 and at their inner ends are soldered to conductors 14 electrically connected to the moving current-carrying coil or armature of the instrument.

The instrument illustrated in the accompanying drawings is of the D'Arsonval type and comprises a permanent magnet 15 having spherical magnetic pole pieces 16 and a spherical magnetic core 17 with a circular electric current carrying coil 18 movably mounted in the spherical air gap between the pole pieces and core. The magnet 15 is of the horseshoe type and is circular in cross section. The ends of the magnet are squared or planed by machine or in any suitable manner. The magnet 15 is secured to a plate 19 of non-magnetic material which is itself mounted on the base 11 by means of three screws 20. The plate 19 has two hooked ears 21 projecting upwardly therefrom, which are designed to engage over the magnet 15 near the ends thereof, as shown in Figs. 2 and 10. A conically-headed nut 22 is threaded on a bolt 23 riveted or otherwise suitably secured to the plate 19 and serves to securely hold the magnet in the hooked ears 21 by its wedging action, as will be clearly understood by reference to Figs. 2 and 3 of the drawings.

The spherical pole pieces 16 are stamped from circular disks of steel. After the stamping operation, the resulting cup-shaped members are machined on three surfaces, first, on the bottom to provide a squared or flat surface for engagement with one of the squared ends of the magnet 15, second, on the outer end to determine definitely the depth of the pole piece, and third, on the outer circumferential surface, whereby the outer or peripheral edge of the pole piece is squared to accurately fit in a circular recess of a non-magnetic supporting member 24. The supporting member 24 is bolted to a bracket 25 bent up from the lower end of the plate 19. The supporting member comprises a circular portion having on each end the aforementioned circular recesses for the peripheral edges of the pole pieces 16 and end bracket portions 24' in which are mounted the jewel screws 33 for the moving coil or element 18. The circular portion of the supporting member 24 is centrally positioned between the ends of the magnet and so that the circular recesses are concentric with the circular ends of the magnet.

The moving coil 18 consists of the desired number of turns of fine insulated wire wound on a circular shell and rotatably mounted in the spherical air gap between the inside surfaces of the pole pieces 16 and the stationary spherical core 17. The spherical core 17 is preferably a steel ball suitably secured to the core support 24, as for example, by a bolt 28 and nut 29. The core support has a boss 30 with a spherical concave surface for accurately determining the position of the core 17. The bolt 28 has an enlarged head which extends through a hole in the circular portion of the core support 24. The bolt 28 extends through a diametrical hole in the core 17, and the latter is centrally positioned between the pole pieces 16 and securely held in this position by the bolt 28. Upper and lower pivot supports 31 are suitably secured to diametrically opposite points of the circular shell of the moving element 18 and extend through diametrically opposite holes in the core support 24. Pivots 32 are mounted in the ends of the pivot supports 31. The jewels or bearings for the pivots 32 are mounted in the jewel screws 33.

The jewel screws 33 are threaded into the bracket members 24' of the core support. A nut 34 is threaded on each jewel screw 33 and is held relatively fixed in position by means of a pin 35 which extends through registering openings in the nut 34 and bracket 24'. A circular disk 36 is mounted on a circular hub on the bracket 24' and is secured in position by means of the fingers of a spring washer 37 which is confined or tensioned between the disk 36 and the flared head of the nut 34, as clearly shown in Fig. 7 of the drawings. The disk 36 has an arm 38 which is soldered or otherwise suitably secured to the outer end of a helical control spring 39. The tension of the control spring 39 can thus be adjusted by turning the disk 36 on its hub, and the disk will be firmly held in its adjusted position by the spring washer 37. It will also be evident that the jewel screw 33 can be adjusted without affecting the washer or control spring regulator 36.

The inner end of the control spring 39 is soldered or otherwise suitably secured to the pivot support 31. One terminal of the winding on the moving element is brought out to the upper pivot support and the other terminal is brought out to the lower pivot support. Each terminal is clamped to its pivot support by a collar 40 and is then bent over to form a substantially closed loop and is soldered to the first convolution of the control spring, as clearly shown in Fig. 7 of the drawings.

Fig. 7 of the drawings illustrates the upper pivot support and jewel screw mounting, while Fig. 8 illustrates the lower jewel screw and coöperating elements. The upper and lower pivot supports, jewel screw mountings, etc., are substantially identical, except that the lower disk or control spring regulator 36' is arranged to be adjusted from without the instrument. To this end, the disk 36' has an elongated arm 41 in which there is a slot 42. A pin 43 secured near the periphery of a circular disk 44 extends into the slot 42. The disk 44 is soldered or otherwise suitably secured to the inner end of a bolt 45 which extends through a hole in an arm 24'' integral with the core support. A sleeve 46 surrounds the bolt 45 and properly spaces the same. The bolt 45, disk 44 and regulator 36'—41 constitute the zero-adjusting device of the instrument, and it will be obvious that the tension of the lower control spring 39 is adjusted by turning the bolt 45. It will furthermore be observed that the construction is such that the bolt 45 can be continuously turned in either direction without injury to the instrument, since such continuous turning of the bolt 45 merely moves the regulator arm 41 back and forth through a definitely small angle. On account of the zero-adjusting device, the pin 38' of the lower control spring regulator must be electrically insulated from the disk 36', as clearly illustrated in Fig. 9 of the drawings.

The pointer 47 of the instrument is secured to the upper pivot support 31. The pointer is arranged to sweep across a suitable circular scale plate 48. The scale plate is fastened by bolts 26 to two posts 49 secured to and projecting upwardly from the plate 19. Spools 50 are mounted on the posts 49 and serve to carry such resistance wire as may be connected in series with the winding of the moving element. A counter-balancing arm 51 is mounted in a suitable hole in the upper pivot support 31 and is firmly held in position by a coiled spring 52.

A cover comprising a cylindrical sheet metal member 53 and a window 54 of transparent material secured in place by a ring 55 incloses the operative elements of the instrument. The cover is secured in place by bolts 56 which are threaded into metal plugs 57 embedded in the base 11. The zero-adjusting bolt 45 projects through an opening in the rim of the cylindrical member 53 of the cover so that the "zero" of the instrument may be conveniently adjusted without removing the cover.

The spherical pole pieces 16, being stamped from a circular disk of steel or other suitable magnetic material, are of substantially uniform thickness, as will be clearly seen by reference to Fig. 5 in which the pole pieces are shown in section. The squared or flat bottom surface of the pole pieces obviously has a circular periphery and the diameter of this flat bottom surface is approximately the same as the diameter of the squared-end of the magnet 15. The ends of the magnet thus terminate in spherical pole pieces of substantially uniform thickness. The spherical core 17 is separated from the inner spherical surfaces of the pole pieces 16 by a substantially uniform air gap of spherical configuration. The uniform thickness of the spherical pole pieces and the uniform spherical air gap insure a substantially uniform magnetic field in the air gap. The pole pieces 16 are machined to accurately fit between the ends of the magnet 15 and the circular recesses in the adjacent sides of the support 24, and when the pole pieces and magnet have been properly assembled the magnet is firmly secured to the plate 19 by the hooked ears 21 and the clamping nut 22. No bolts, screws, or similar mechanical fastening means are therefore required to securely hold the pole pieces in position, since the dimensions, construction, and arrangement of these pieces is such that they are firmly and securely held in position by the tightening of the bolt 22.

When the spherical air gap between the pole pieces 16 and the core 17 is of exactly uniform thickness or width throughout the magnetic flux across the air gap is slightly more effective at the middle of the pole pieces than elsewhere, and as a result thereof, the scale of the instrument is somewhat unevenly divided for even divisions of current. Where a practically uniform scale is desired, we have found it necessary to slightly displace the centers of curvature of the pole pieces 16 with respect to the center of curvature of the spherical core 17, so as to slightly widen the air gap in which the moving element turns at places opposite the ends of the permanent magnet 15. This is accomplished by taking the radius of curvature of the pole pieces 16 a certain distance off the true center of the core 17. This construction will be evident by reference to Fig. 5 of the drawings. The point $c$ represents the true center of the moving element 18 of the instrument and of the spherical core 17. The points $c'$ represent the centers of curvature of the spherical inner surfaces of the two pole pieces 16. Due to this displacement or offsetting of the centers of curvature $c'$ of the pole pieces, the air gap between these pole pieces and the spherical core 17 is slightly wider opposite the ends of the permanent magnet 15. The amount of the displacement of the centers $c'$ should be such as to obtain an exactly uniform flux density throughout the whole air gap in which the armature or moving element 18 turns. We have found it very satisfactory to determine the amount of this displacement experimentally. The magnitude of the displacement is relatively small, being of the order of about 0.01 inch, so that the amount that the pole pieces are off center is not apparent to the naked eye and is only noticeable when attention is particularly directed to this feature, and to all intents and purposes the air gap is substantially spherical and of substantially uniform thickness. Wherever in the appended claims we have defined the air gap as substantially spherical or as substantially uniform it is to be understood that we intend thereby to cover the arrangement described in this paragraph as well as arrangements in which the air gap is of exact uniform thickness.

It will be evident to those skilled in the art, that we have provided an improved electrical measuring instrument of the D'Arsonval type having relatively few parts of simple construction, and adapted to be conveniently assembled. Many modifications of the details of construction and arrangement of the operative elements of this instrument may be made without departing from the spirit of the invention. We aim, accordingly, to cover all such modifications in the appended claims.

What we claim as new and desire to secure by Letters Patent of the United States, is:—

1. An electrical measuring instrument comprising a permanent magnet having a substantially circular section, a pair of cup-shaped magnetic pole pieces having a flat bottom surface of substantially the same diameter as the diameter of the ends of said magnet, the flat surface of each of said pole pieces being in contact with one of the ends of said magnet, a spherical magnetic core mounted within said pole pieces and separated therefrom by a substantially uniform air gap of spherical configuration, and a circular current carrying coil movably mounted in said air gap.

2. An electrical measuring instrument comprising a permanent magnet, a supporting member having a middle portion and a bracket at one end thereof, a cup-shaped magnetic pole piece secured between the middle portion of said support and each end of said magnet, a spherical magnetic core supported by said member within said pole pieces and separated from the inner surfaces of said pole pieces by a substantially spherical air gap, a moving element pivotally mounted within said spherical air gap, a pivot jewel screw for said element mounted in said bracket, a regulator rotatably mounted on said bracket, a control spring having one end connected to said regulator and its other end to said element, a nut threaded on said jewel screw and relatively fixed with respect to said bracket, and a spring washer tensioned between said nut and said regulator and adapted to maintain said regulator in position with respect to said bracket.

3. An electrical measuring instrument comprising a base plate, a permanent magnet, a pair of hooked ears projecting from said plate and engaging said magnet, a supporting member secured to said plate intermediate the ends of said magnet and having a circular recess opposite each end of the magnet, a cup-shaped magnetic pole piece having a flat bottomed surface in contact with each end of said magnet, the peripheral edge of each pole piece fitting in the opposite recess of said member, a bolt secured to said plate, and a nut threaded on said bolt and adapted to bind said magnet beneath said hooked ears whereby the magnet and coöperating pole pieces are securely mounted on said plate.

4. An electrical measuring instrument comprising a movable element, a control spring for said element, a stationary member, a jewel screw for said element threaded into said member, a regulator for said spring movably mounted on said stationary member, a resilient member operatively related to said regulator, a nut threaded on said screw and adapted to place said resilient member under tension so as to firmly hold said regulator against said resilient member, and a pin adapted to prevent relative movement of said nut with respect to said stationary member.

5. An electrical measuring instrument comprising a permanent magnet, spherical magnetic pole pieces secured to the ends of said magnet, a spherical magnetic core mounted between said pole pieces and separated therefrom by a substantially spherical air gap, the center of curvature of said pole pieces being slightly displaced from the center of curvature of said core so that said air gap is slightly wider opposite the centers of the pole pieces than elsewhere, and a circular electric current carrying coil movably mounted in said air gap.

In witness whereof, we have hereunto set our hands this 5th day of November 1917.

WILLARD E. PORTER.
ALVARADO L. R. ELLIS.